Patented Mar. 11, 1947

2,417,046

UNITED STATES PATENT OFFICE 2,417,046

SYNTHESIS OF ALKYLATED PYRROLE COMPOUNDS

Lester A. Brooks, Stamford, Vt., and Moushy Markarian, North Adams, Mass., assignors to Sprague Specialties Company, North Adams, Mass., a corporation of Massachusetts No Drawing. Application March 7, 1944,
Serial No. 525,444

10 Claims. (Cl. 260—313)

This invention relates to improved methods for manufacturing pyrrole compounds, and more specifically refers to an improved method for producing 2,5 dimethyl pyrrole.

Pyrrole is a well known heterocyclic compound, obtainable by the distillation of bone-tar or bone-oil with sulfuric acid. 2,5 dimethyl pyrrole, a derivative of pyrrole, may be prepared synthetically by several methods. The first method is the reaction of acetonyl acetone with ammonium carbonate and distillation of the product therefrom. This process has several disadvantages. The ammonium carbonate tends to sublime in the reaction vessel, the still and the condenser, thereby causing plugging of the equipment, and lowered efficiently from a yield, heat transmission, and agitation standpoint.

Another method is to heat acetonyl acetone with ammonium acetate in glacial acetic acid. This particular method involves the use of an additional chemical compound and the separation of the resulting reaction product is difficult and expensive.

A third method used to produce 2,5 dimethyl pyrrole is to heat acetonylacetone and alcoholic ammonia in a sealed tube or other suitable container at 150° C. The yields obtained therefrom are low and unsatisfactory.

It is an object of this invention to produce alkylated pyrrole compounds by an improved process which overcomes the foregoing disadvantages. It is a further object to produce alkylated pyrrole compounds, by a simple, inexpensive and efficient process. It is a further object to produce 2,5 dimethyl pyrrole by a new process which results in exceptionally high yields. Another object is to produce new polymeric materials from alkylated pyrroles. Another object is to produce N-vinyl 2,5 dimethyl pyrrole by a simplified process. Additional objects will become apparent from a consideration of the following description and claims.

In accordance with this invention these objects are attained by reacting ammonia, in some cases in the presence of a catalyst, with a compound corresponding to the following general formula:

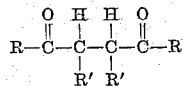

wherein R represents an alkyl group; and R' represents hydrogen, halogen, an aryl, aralkyl or alkyl group. In a more restricted sense the invention is concerned with the reaction of ammonia and acetonylacetone in the presence of carbon dioxide to produce 2,5 dimethyl pyrrole. In its preferred embodiment the invention is concerned with the reaction of ammonia and acetonylacetone in the presence of from 10% to 30% carbon dioxide (based upon the amount of diketone) at temperatures from about 25° C. to about 140° C. An additional embodiment of the invention is concerned with the substitution of a vinyl group for the hydrogen on the nitrogen of the pyrrole compound to produce a readily polymerizable compound, which possesses outstanding electrical properties when in the polymerized state.

As heretofore mentioned, acetonylacetone has been used to produce 2,5 dimethyl pyrrole. However the difficulties in yield and/or production have made the prior processes unsuitable for large scale commercial manufacture. It has been found that the disadvantages of these prior processes may be completely overcome by the procedure described herein.

In accordance with the invention acetonylacetone or similar compound or a mixture thereof is agitated with either liquid or gaseous ammonia, preferably in the presence of small amounts of carbon dioxide. This reaction produces large amounts of 2,5 dimethyl pyrrole or related compounds. These compounds are readily separated from the reaction mixture in a surprisingly pure state. The reaction probably proceeds, as follows:

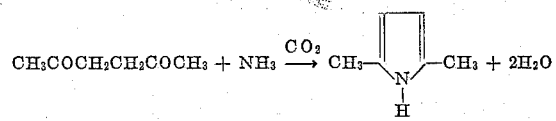

Any unreacted acetonylacetone will dissolve in the water formed, leaving the pyrrole oil layer of substantially pure 2,5 dimethyl pyrrole.

In like manner, it has been found that this simplified reaction is applicable to diketone compounds conforming to the general formula referred to previously.

In some cases the use of carbon dioxide as a catalyst is not required, but lower yields have been obtained by reacting only the ammonia and diketone without this catalyst. The reaction proceeds at a much faster rate when carbon dioxide is employed if only in minute amounts. While the exact reason for this is not known, it may be that ammonium carbamate and ammonium carbonate are continuously generated, the ammonium carbonate being immediately consumed in the reaction. As the ammonium carbonate is consumed, carbon dioxide is released and the formation of ammonium carbamate is begun, which compound in the presence of water, decomposes to form the carbonate again. This regeneration process may explain the value of carbon dioxide as a catalyst.

The invention may be further understood by a consideration of the following illustrative examples:

Example 1

Acetonyl acetone (100 gms.) was introduced into a jacketed closed vessel. Agitation was commenced and 22 gms. of carbon dioxide added. 88 gms. of liquid ammonia was introduced in the vessel. The temperature rose within five minutes following the initial addition of the ammonia to about 100° C. The vessel was heated to 115° C. and held there with agitation for 90 minutes. The vessel was cooled and the agitation stopped. The 2,5 dimethyl pyrrole and water separated into layers and the water, being heavier, was drained off the bottom of the vessel with the aid of a sight glass.

The 2,5 dimethyl pyrrole was then reheated in the vessel and any remaining water distilled off at 100° C. The temperature of the vessel was then raised to about 165–169° C. when the 2,5 dimethyl pyrrole distilled over and was condensed in a receiver. Acetonyl acetone boils at 192–194° C. The yield of pure 2,5 dimethyl pyrrole obtained was about 75%.

Example 2

The process of Example 1 was followed but

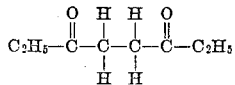

was used in place of acetonyl acetone. A good yield of 2,5 dimethyl pyrrole was obtained.

Example 3

Example 1 was repeated in the absence of carbon dioxide. A yield of slightly more than half that of Example 1 was obtained.

Example 4

The process of Example 1 was followed, using

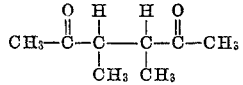

(3,4 dimethyl 2,5 hexanedione) in place of acetonyl acetone. A good yield of 2,3,4,5 tetramethyl pyrrole was obtained.

Example 5

The process of Example 1 was followed but an equivalent amount of aqueous ammonia (30% $NH_3$) was added to the reaction vessel instead of liquid or gaseous ammonia. The yield was less than two-thirds that of Example 1.

Example 6

The process of Example 1 was followed but 3,4 diphenyl, 2,5 hexanedione was substituted for acetonyl acetone. A satisfactory yield of 3,4 diphenyl 2,5 dimethyl pyrrole was obtained.

Example 7

The process of Example 1 was followed but 3 chlor 2,5 hexanedione was substituted for acetonylacetone. The yield of 3 chlor 2,5 dimethyl pyrrole was good.

Example 8

The 2,5 dimethyl pyrrole obtained in Example 1 was reacted with acetylene in the presence of potassium hydroxide as is explained in detail in copending application Serial No. 475,051 entitled "Polymerizable and related compositions and processes for their production and use," filed on February 6, 1943, by L. A. Brooks. N-vinyl, 2,5 dimethyl pyrrole was thereby obtained in good yield. It was polymerized readily by heating at 130° C. to form a hard resinous mass possessing good electrical properties.

The examples cited above are illustrative only and may be varied widely without departing from the scope of this invention.

The temperature at which the reaction ensues most rapidly is, in general, about 120° C. but any temperature may be used from about 25° C. to about 140° C. with excellent results. Temperatures outside the foregoing range may also be used but the results are ordinarily not as satisfactory.

The time of reaction is, in part, dependent upon the temperature thereof. However, when from 10% to 30% carbon dioxide is used the reaction is generally near completion after 30 minutes at 120° C., but it often is desirable to increase the reaction time to as much as 3 hours for highest yields.

The ammonia is advisably liquid or gaseous since aqueous ammonia produces a somewhat lower yield. The acetonylacetone or other hexanedione derivative should preferably be substantially pure, so that the final reaction products may be separated more readily. However, commercial grades may be used.

The carbon dioxide, if employed, may be commercial "Dry Ice," and merely dropped in the reaction vessel. Gaseous carbon dioxide may also be introduced with equally satisfactory results.

The by-product water may be fractionally distilled or otherwise treated to separate any reactants dissolved therein. In many cases, acetonylacetone may be removed from the water and used again as a reactant.

The products obtainable by the syntheses described herein may be used for a number of purposes in addition to their use as intermediates in the manufacture of N-vinyl compounds. They may be used as intermediates in the production of pharmaceuticals, dyes, surface-active agents, and the like. Likewise, they may be used in the manufacture of rubber chemicals.

Since the pressures involved are generally less than 100 pounds per square inch, depending upon the freeboard and amount of ammonia present, ordinary jacketed equipment may be used.

As many widely apparently different embodiments of this invention may be made without departing from the spirit and scope hereof, it is to be understood that the invention is not limited to the specific embodiments hereof except as defined in the appended claims.

We claim:

1. A method for producing alkylated pyrrole compounds which comprises adding undissolved and uncombined ammonia to a compound conforming to the following general formula:

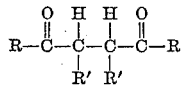

wherein R represents an alkyl group; and R′ represents a member selected from the class consisting of hydrogren, halogen, aryl, and alkyl groups, and reacting said materials at elevated temperatures.

2. The method described in claim 1, wherein a small amount of carbon dioxide is used as a catalyst and the temperature of the reaction is maintained in the range from about 25° C. to about 140° C., the aforesaid amount of carbon dioxide being based upon the amount of ammonium employed.

3. A method for producing 2,5 dimethyl pyrrole which comprises adding undissolved and uncombined ammonia to acetonylacetone and reacting said materials at elevated temperatures from about 25° C. to about 140° C.

4. The method described in claim 3, wherein a small amount of carbon dioxide is used as a catalyst, the aforesaid amount of carbon dioxide being based upon the amount of ammonia employed.

5. A method for producing alkylated pyrrole compounds which comprises adding undissolved and uncombined ammonia to a compound conforming to the following general formula:

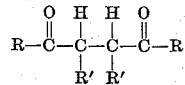

wherein R and R' represent alkyl groups, and reacting said materials at elevated temperatures.

6. The method described in claim 5, wherein a small amount of carbon dioxide is used as a catalyst and the temperature of the reaction is maintained in the range from about 25° C. to about 140° C., the aforesaid amount of carbon dioxide being based upon the the amount of ammonia employed.

7. A method for producing alkylated pyrrole compounds which comprises adding undissolved and uncombined ammonia to a compound conforming to the following general formula:

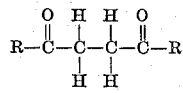

wherein R represents an alkyl group, and reenacting said materials at elevated temperatures.

8. The method described in claim 7, wherein a small amount of carbon dioxide is used as a catalyst and the temperature of the reaction is maintained in the range from about 25° C. to about 140° C., the aforesaid amount of carbon dioxide being based upon the amount of ammonia employed.

9. A method for producing 2,5 dimethyl pyrrole which comprises adding about 88 parts by weight of undissolved and uncombined liquid ammonia to about 100 parts by weight of acetonylacetone and heating said materials for about 90 minutes to a temperature of about 115°C.

10. The method described in claim 9, wherein about 22 parts by weight of carbon dioxide is used as a catalyst.

LESTER A. BROOKS.
MOUSHY MARKARIAN.

REFERENCES CITED

The following references are of record in the file of this patent:

Chem. Abstracts, vol. 30 (1936) p. 3816, citing: Organic Syntheses, vol. 16, pp. 25–27, 1936.

Chem. Abstracts, vol. 28 (1934) p. 5438, citing: Berichte, vol. 18, pp. 2254–5 (Paal).